United States Patent
Van Daalen

[15] 3,667,647
[45] June 6, 1972

[54] HOLDER FOR A NUMBER OF ASSOCIATED INDIVIDUAL CONTAINERS

[72] Inventor: Leendert Van Daalen, Slikkerveer, Netherlands

[73] Assignee: N. V. Plastic Industrie Van Daalen, Sliedrecht, Netherlands

[22] Filed: Mar. 18, 1970

[21] Appl. No.: 20,741

[30] Foreign Application Priority Data

Mar. 26, 1969 Netherlands..........................6904643

[52] U.S. Cl. ..............................220/23.4, 206/65 R, 217/26, 220/23.6, 220/97 B
[51] Int. Cl. ....................................B65d 69/00, B65d 21/02
[58] Field of Search.....................220/23.4, 23.6, 97 B, 97 R; 217/26, 26.5; 206/65 R, 72; 229/87 F

[56] References Cited

UNITED STATES PATENTS

| 258,220 | 5/1882 | Cochrane | 217/26 UX |
| 3,369,659 | 2/1968 | Ettlinger | 217/26 X |
| 3,109,579 | 11/1963 | Crane | 229/87 F |
| 3,389,825 | 6/1968 | Whiteford | 220/23.4 |
| 3,497,102 | 2/1970 | Bessett | 217/26.5 X |

*Primary Examiner*—George E. Lowrance
*Attorney*—Waters, Roditi, Schwartz & Nissen

[57] ABSTRACT

A stackable holder for a number of individual containers, for vegetables and fruit, with a plate which carries the containers by their bottom and is provided with openings and raised parts to ventilate the contents of the containers.

5 Claims, 5 Drawing Figures

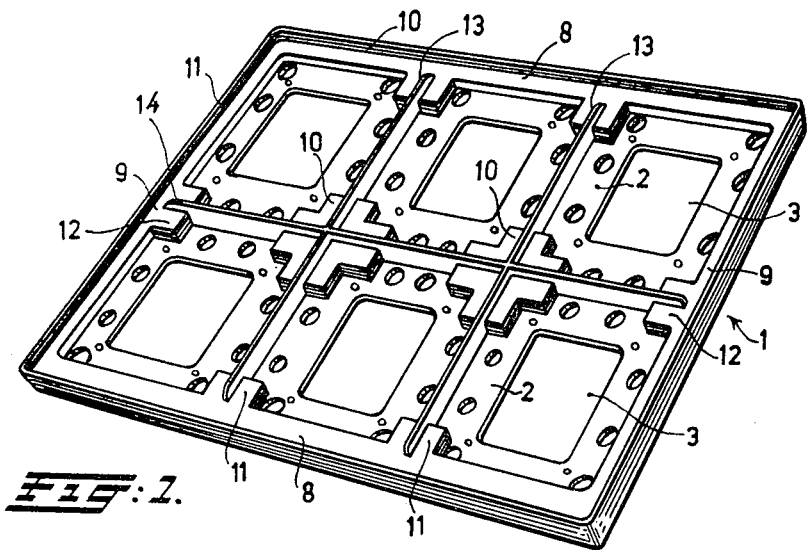
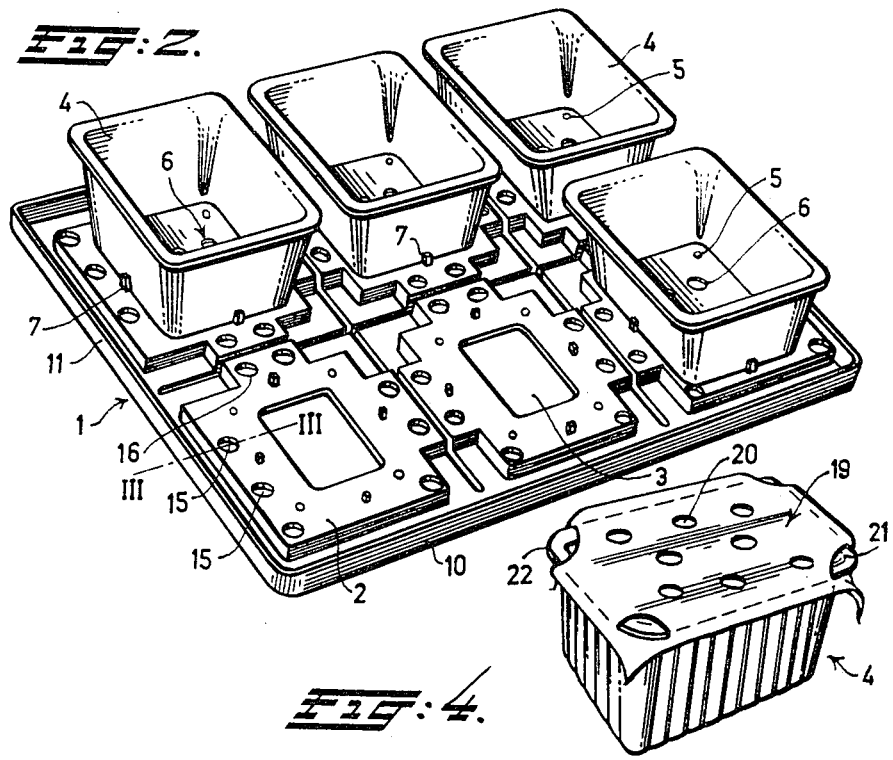

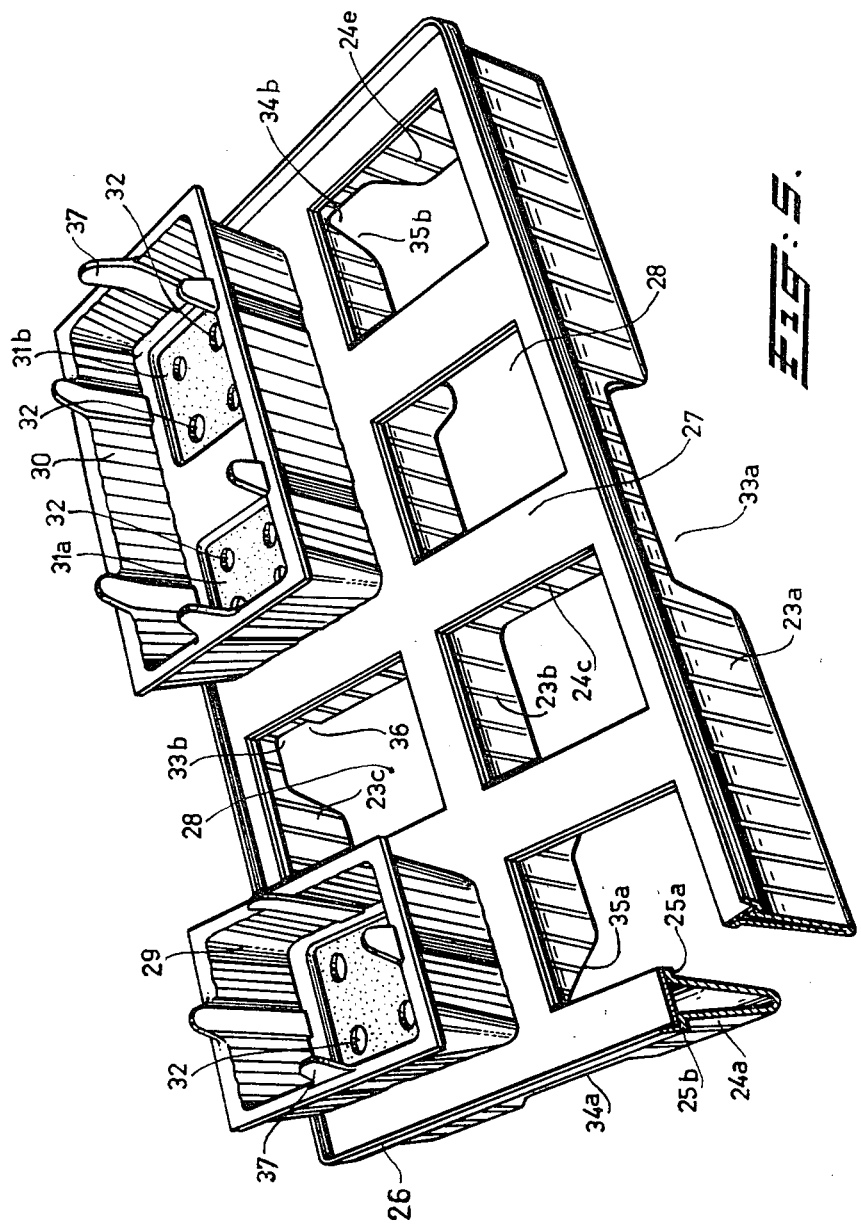

3,667,647

HOLDER FOR A NUMBER OF ASSOCIATED INDIVIDUAL CONTAINERS

BACKGROUND OF THE INVENTION

The invention relates to a holder for a number of associated individual containers, particularly for packing vegetables and fruit.

For the transport of vegetables and fruit from the grower to the market nowadays often, preferably plastic made, skeleton cases are employed which only once are used. These cases, due to their construction, do not only meet the requirements of a proper protection for the contents but also of a sufficient ventilation thereof. The latter condition is e.g. for mushrooms of great importance.

Since these large packings obviously are unfit to be delivered together with their contents to the consumer the contents should be transferred to smaller units viz. to small containers in which the vegetables or the fruit are supplied to the retailer or supermarket. This repacking does not only raise the price, but moreover has the drawback that frequently vegetables or fruit, after having been kept for some time in these containers, fall off in quality or even deteriorate entirely. Ventilation of the contents of these containers, which are often stored in boxes, is namely entirely non-existent.

BRIEF SUMMARY OF THE INVENTION

It is an object of the invention to provide a packing for vegetables and fruit which is constructed in such a way that the products concerned can already be packed in the containers by the grower, whereby always a number of these containers are united to a unit, which units are brought to the market and therefrom finally reach the place of sale. In addition this packing should meet all requirements of the conventional large packings, particularly as to the ventilation of the contents.

According to the invention these conditions are satisfied by a holder which is characterized by a plate on which the individual containers can be detachably secured by their bottom on a number of supporting surface which each are provided with one or more openings coinciding at least partially with openings in the bottoms of the respective containers, while these supporting faces, at the location of at least portions of the vertical projections thereof of the upper edges of the containers, are connected with deepened portions, substantially situated in one plane, serving as supporting faces for stacking the plate on a similar unit thereunder, while furthermore in the plate, outside of the bottoms' boundary of the containers to be disposed thereon, apertures are provided via which when a number of units are stacked, the respective spaces above the containers communicate with the atmosphere.

With such a packing a correct choice of the material makes it possible to obtain a proper protection of the contents. By securing a number of containers on the plates units are formed which can be stacked and as a consequence can be treated and conveyed in the same way as the conventional large packings. The presence of the ventilation apertures in the bottom of the containers and the fact that always when a number of containers are stacked, the space above each container communicates on the one hand, via the apertures in the bottom, with the container situated over it and on the other hand, via the apertures in the plate, with the atmosphere ensures an excellent ventilation of the containers. The holders with the containers secured thereon may be displayed at the place of sale and the buyers can remove the desired number of containers from the holder.

Preferably the deepened parts on the outer edges of the plate merge into a downwardly pressed-out, surrounding, stacking edge. Hereby a sure stacking of the holders is ensured while the risk of sidewise shifting is avoided.

The plate can be reinforced in the way that the supporting faces are at least bounded on two sides by a downwardly pressed-out reinforcing profile.

Preferably each container is closed by a preferably transparent foil, provided with apertures.

The positioning of the containers on the plates during the manufacturing is facilitated when the supporting faces are provided with centering cams for the containers.

The whole can be entirely plastic made; the containers can be secured to the supporting faces by welding.

BRIEF DESCRIPTION OF THE DRAWINGS

FIG. 1 is a perspective under view of the holder according to the invention;

FIG. 2 is a perspective upper view of the plate with a number of containers provided thereon;

FIG. 4 is a perspective view of an individual container provided with a closing foil;

FIG. 5 is a perspective view of another embodiment according to the invention.

DESCRIPTION

Figure 3:
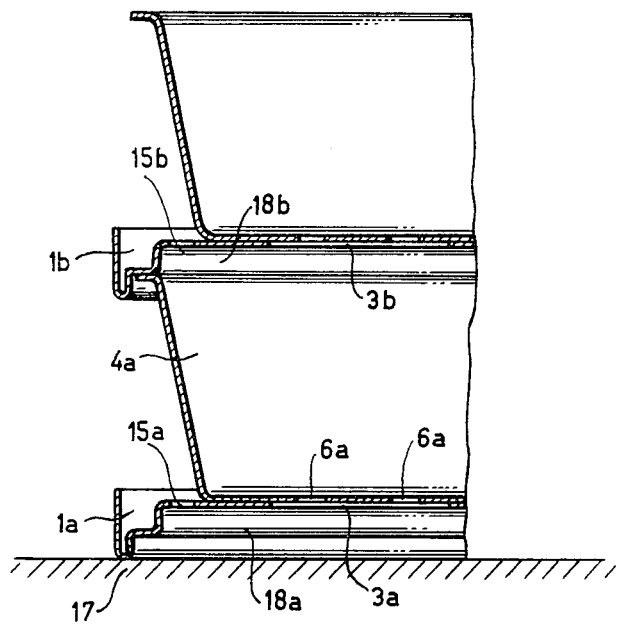
FIG. 3 is a cross section according to the line III—III in FIG. 2.

The plate which is denoted as a whole by the numeral reference 1, comprises a number, in the shown embodiment six, of supporting faces 2 in each of which a central, large, opening 3 is formed. On these supporting faces 2 fit the containers 4 which are secured thereon by means of four spot welds 5.

A number of apertures 6, e.g. are formed in the bottom of each container, which lie within the delimitation of the large opening 3. Obviously it would be sufficient to form only four apertures 6, coinciding with the apertures 6 in the supporting faces 2, instead of the single large opening, but the cutting out of the large opening gives a certain saving of material since the material which is cut-out can be ground and used again.

The supporting faces are provided with upright centering cams 7 which facilitate the correct placement of the containers 4 prior to their securing by welding.

As is shown in the figures the supporting faces merge into a number of deepened parts. Along the outer walls of the plate these deepened parts are formed by the longitudinal edges 8, 9 and in the central portion of the plate these deepened parts are formed by the cross-shaped parts 10. Both the longitudinal edges 8 and the transverse edges 9 are prolonged by inwardly protruding parts 11, 12, respectively.

A downwardly directed frame of ribs 13, 14 enhances the rigidity of the plate.

FIG. 2 shows how the supporting faces are provided beyond the bottom delimitation of the containers disposed thereon with ventilation apertures 15, 16. The purpose of these apertures will be clarified hereinafter with reference to FIG. 3.

The edges 8, 9 merge into stacking surfaces 10, 11 which ensure that when a number of plates provided with containers are stacked no shifting with respect to each other can occur.

FIG. 3 illustrates how, due to the features according to the invention, the ventilation of the contents of the respective containers 4 is ensured. When the plate 1a represented in this figure bears on the ground 17 the space 18a between the ground 17 and the supporting faces communicates through the apertures 12a with the atmosphere. The contents of the container 4a communicates through the bottom apertures 6a and the aperture 3a in the supporting face with the space 18 and therefore also with the atmosphere.

Of a second holder, stacked on the first one, the space 18b below the plate 1b communicates with the atmosphere so that air can flow freely through the apertures 15b, the container 4a, the space 18 and the apertures 15a. An air current is also possible over the upper side of the container 4a, viz. through the aperture 15b, through the space between the container 4a and the plate situated over same to the opposite analogous apertures 15. Also an air current in a vertical direction through the superposed containers of a number of stacked holders is not impeded.

FIG. 4 illustrates how each container is preferably closed by a, preferably transparent, foil 19 provided with ventilation apertures 20. In this foil and at each corner thereof an aperture 21 is formed almost coinciding with the corners 22 of the container 4; the foil is secured by pulling same on the container whereby the corners protrude through the apertures 21.

FIG. 5 shows another embodiment according to the invention. Here the plate is constituted by a framework of three longitudinal ribs 23a, 23b and 23c with U-shaped cross-section, which are inter-connected by five shorter ribs 24a, 24b, 24c, 24d and 24e. The upper edges of the ribs, merge into the rims 25a and 25b respectively, the latter of which merges into the upstanding edge 26 which completely surrounds the plate. The upper side of the ribs is closed by an upper sheet 27 which is secured to the ribs in a suitable way, e.g. by welding, and which is provided with the large square openings 28.

These openings 28 accommodate the containers, two of which are shown and denoted by the reference numerals 29, 30. The container 39 is a smaller one while the container 30 is a larger one of which the bottom is formed with two downwardly pressed out parts 31a, 31b, which fit into the openings 28. The bottoms of each container are also provided with small openings 32.

Of the long ribs 23a, 23c the under edge is raised over a certain distance, forming openings 33a and 33b, in the same way the short ribs 24a and 24e are provided with openings 34a and 34b; as the end of the center rib 23b rises gradually at 35a, 35b in the same way as the ends of the center rib 24c (at 36) the whole space under the plate and above containers whereunder can be ventilated by air currents, which flow through there openings.

To prevent a sidewise shifting of a number of stacked units the upper edge of the containers are provided with cams 37 which cooperate with the undersides of the ribs of the unit stacked thereon.

Also when a single plate with containers is placed on a flat underground the ventilation of the contents is ensured. A buyer of a container simply pulls it loose from the plate which is possible without great effort, particularly when the containers and the plate are made of plastic. The closing foil 19 prevents tempering with the contents, particularly in supermarkets.

When all containers of a plate have been sold the shopkeeper throws away the plate.

The holder according to the invention provides a solution for the problem how to transfer sensitive and perishable vegetables and fruit from the grower to the consumer without additional operations like repacking and the like, whilst ensuring an adequate protection and maintaining conditions which prevent decay in the best possible way.

What is claimed is:

1. In combination, a tray having a plurality of apertures, and associated individual containers for vegetables and fruit or the like, each said container being detachably secured to said tray, each tray aperture having dimensions approximating the configuration of the bottom wall of an associated container, openings extending through the bottom wall of said container, at least one of said openings being in alignment with said tray aperture, means on said tray forming supporting faces for portions of the container bottom wall, further apertures in said tray located exteriorly of the vertical projection of container on said tray to provide communication with surrounding atmosphere, the container-supporting regions of said tray adjacent its rim depending below the top thereof so as to form supporting surface means when stacking a plurality of container-loaded trays.

2. A combination as claimed in claim 1, including a plurality of downwardly depending extensions of generally V-shaped cross-section provided on said tray rim so as to reinforce the tray rim portions.

3. A combination as claimed in claim 1, including downwardly depending reinforcing wall members extending from at least two sides of each of said container-supporting means on said tray, said wall member being positioned on the sides disposed furthest from the tray rim.

4. A combination as claimed in claim 1, including a plurality of projections about each of said container-supporting tray means, said projections being adapted to accurately position said containers on said tray.

5. A combination as claimed in claim 1, wherein said tray and said containers are each constituted of a plastic material, said containers being secured to said tray by separable spot welds.

* * * * *